US012597867B2

(12) United States Patent
Wang et al.

(10) Patent No.: US 12,597,867 B2
(45) Date of Patent: Apr. 7, 2026

(54) ELECTRICAL POWER SYSTEM CONVERTER CONTROL

(71) Applicant: ROLLS-ROYCE plc, London (GB)

(72) Inventors: Shuai Wang, Singapore (SG); Chandana J. Gajanayake, Singapore (SG); Amit K. Gupta, Singapore (SG)

(73) Assignee: Rolls-Royce PLC, London (GB)

(*) Notice: Subject to any disclaimer, the term of this patent is extended or adjusted under 35 U.S.C. 154(b) by 334 days.

(21) Appl. No.: 18/358,235

(22) Filed: Jul. 25, 2023

(65) Prior Publication Data

US 2024/0063729 A1 Feb. 22, 2024

(30) Foreign Application Priority Data

Aug. 17, 2022 (GB) ...................................... 2211976

(51) Int. Cl.
| | |
|---|---|
| *H02M 1/32* | (2007.01) |
| *H02H 3/02* | (2006.01) |
| *H02H 9/02* | (2006.01) |
| *H02J 3/38* | (2006.01) |
| *H02M 7/217* | (2006.01) |
| *H02M 7/219* | (2006.01) |

(52) U.S. Cl.
CPC .............. *H02M 7/219* (2013.01); *H02J 3/381* (2013.01); *H02M 7/2173* (2013.01); *H02J 2310/44* (2020.01)

(58) Field of Classification Search
CPC ............ H02H 3/02; H02H 3/08; H02H 3/105; H02H 3/14; H02H 9/02; H02H 9/04; H02H 3/20; H02M 7/219; H02M 7/2173; H02M 7/08; H02M 1/32
See application file for complete search history.

(56) References Cited

U.S. PATENT DOCUMENTS

| | | | |
|---|---|---|---|
| 2012/0013182 A1* | 1/2012 | Minegishi | ............... B60L 50/61 307/9.1 |
| 2017/0033708 A1* | 2/2017 | Elserougi | ............. H02H 7/1257 |
| 2020/0136370 A1* | 4/2020 | Loder | ........................ H02J 3/36 |
| 2021/0336530 A1* | 10/2021 | Shen | ........................ H02M 1/32 |
| 2022/0085731 A1* | 3/2022 | Mohanaveeramani | . H02M 7/49 |
| 2022/0190591 A1 | 6/2022 | Wang et al. | |

FOREIGN PATENT DOCUMENTS

EP 3648274 A1 5/2020

OTHER PUBLICATIONS

Great Britain search report dated Feb. 10, 2023, issued in GB Patent Application No. 2211976.2.

* cited by examiner

*Primary Examiner* — Sisay G Tiku

(57) ABSTRACT

An electrical machine with a rotor coupled to a drive shaft of an engine; a DC electrical network; a power electronics converter connected, on a DC-side, to the DC electrical network, and, on an AC-side, to the electrical machine, the power electronics converter comprising a plurality of transistors and associated diodes connected in anti-parallel with the transistors; and a controller configured to control switching of the transistors so that the converter either inverts DC power to AC power or rectifies AC power to DC power. The controller is further configured, responsive to a determination that there is a fault in the DC electrical network, to operate in a fault mode in which the controller controls the switching of the transistors so that a fault current is shared between the transistors and the associated diodes.

14 Claims, 8 Drawing Sheets

340

400

G/M

ELECTRICAL POWER SYSTEM CONVERTER CONTROL

CROSS-REFERENCE TO RELATED APPLICATIONS

This specification is based upon and claims the benefit of priority from United Kingdom Patent Application No. 2211976.2, filed on 17 Aug. 2022, the entire contents of which are incorporated herein by reference.

BACKGROUND

Technical Field

This disclosure relates to electrical power systems, more particularly to the control of power electronics converters in electrical power systems. The electrical power systems may be of particular utility in transport applications including but not limited to aerospace.

Description of the Related Art

In aerospace, aircraft and their power and propulsion systems are becoming increasingly electric in their design. So-called 'more electric engines' (MEEs) and 'more electric aircraft' (MEAs) derive all or substantially all of their propulsive thrust from turbomachinery but make greater use of electrical power compared with conventional platforms. They may, for example, use electrical power to power auxiliary systems which have previously been powered mechanically or pneumatically, or may use spool-coupled electrical machines to transfer power to, from and between engine spools to provide improvements in engine operability and efficiency. In hybrid electric aircraft the propulsive thrust is derived from engines (e.g., gas turbine engines) and from other sources, typically batteries and/or fuel cells which supply electrical power to engine- or propulsor-coupled electrical machines.

Some proposed more electric and hybrid electric platforms include DC electrical networks which receive electrical power from engine-driven electrical machines via AC to DC converters (i.e., rectifiers). The circuit of FIG. 3 illustrates a typical arrangement in which a three-phase permanent magnet electrical machine, which may be coupled with and drive a spool of a gas turbine engine, is connected with a DC network via a two-level AC/DC converter.

The circuit of FIG. 4 illustrates the effect of a fault in the DC network which places a low impedance across the network terminals. In this case both the DC and AC sides of the converter assume a low voltage condition, which in the limit may be zero volts. In this condition a fault current will flow from the electrical machine back into the converter due to the presence of the permanent magnets. The level of this current, which will be supplied to the DC network in the faulted condition, will therefore depend mainly on the voltage generated by and the impedance of the fault, the impedance of any cabling, and the impedance of the electrical machine.

In some applications it is acceptable for the converter to operate as an uncontrolled diode rectifier when there is a DC network fault. In other applications, however, including aerospace applications, this mode of operation may be highly undesirable because the electrical machines may generate high voltages and/or may have low impedances, such that the high levels of fault current will be supplied to the fault site in the DC network.

SUMMARY

The disclosure is directed to an electrical power system, a method of controlling an electrical power system and a controller for an electrical power system as set out in the appended claims.

According to a first aspect, there is provided an electrical power system comprising: an electrical machine comprising a stator and a rotor, the rotor coupled to a drive shaft of an engine; a DC electrical network; a power electronics converter connected, on a DC-side, to the DC electrical network and, on an AC-side to the electrical machine, the power electronics converter comprising a plurality of transistors and associated diodes connected in anti-parallel with the transistors; and a controller configured, in a normal operation mode, to control switching of the transistors of the converter so that the converter either inverts DC power received from the DC electrical network to AC power and provides the AC power to the electrical machine or rectifies AC power received from the electrical machine to DC power and provides the DC power to the DC electrical network, wherein the controller is further configured, responsive to a determination that there is a fault in the DC electrical network, to operate in a fault mode in which the controller controls the switching of the transistors of the converter so that a fault current is shared between the transistors and the associated diodes of the converter.

By sharing the fault current between the transistors and associated diodes, the need to over-size the components of the power electronics converter, and specifically the transistors, is reduced. Moreover, as conduction losses can be minimised, the thermal properties of the system are improved. Active cooling measures may therefore be reduced, for example the size of a cold plate used to cool the power electronics.

Controlling the switching of the transistors to share the fault current between the transistors and the associated diodes may comprise controlling an on-time of the transistors, during which they conduct the fault current from the electrical machine. For example, the controller may be configured to provide on gate pulses for the transistors based on a determined phase current vector. This may include shifting a normal operation mode phase angle by a predetermined angle aligned with the phase current vector. This may be achieved, for example, by implementing zero-crossing detection or a current phase locked loop.

In the fault mode, the controller may be configured to control the on-time of the transistors so as to be less than a full half-cycle with respect to the fault current. For example, the on-time of the transistors may be controlled so as to be less than 180° of the phase current whereby the transistors conduct for only part of the half-cycle of AC power received from the electrical-machine. Alternatively, the on-time of the transistors may be controlled so as to be on for a full 180° of phase current.

In the fault mode, the controller may be configured to compare a magnitude of the fault current to a threshold, and to turn on one or more of the transistors when the magnitude of the fault current exceeds the threshold and to switch off the one or more transistors when the magnitude of the fault current is less than the threshold. The controller may be configured to modify the threshold, for example based on a sensed temperature or an estimated temperature (estimated using e.g., a model) of one or more of the transistors and/or one or more of the diodes. This can allow the controller to dynamically rebalance the fault current through the transistors and diodes by considering, e.g., the phase currents, case temperature/junction temperature of the converter and/or other operation conditions of the converter. This can improve the balance of thermal load between the transistors and the associated diodes.

Where the transistors have a lower current rating than the associated diodes, the controller may be configured to ensure that the fault current passing through the transistors does not exceed the current rating of the transistors.

The electrical power system may further comprise a supplementary freewheeling diode subcircuit, connected in parallel with the power electronics converter. Such a subcircuit can further share the fault current, and so reduce the load on the transistors and diodes of the power electronics converter.

The controller may be configured to determine the fault in the DC electrical network by determining that a phase current through the power electronics converters, or a rate of change of phase current through the power electronics converter with respect to time, has exceeded a protection threshold. Where the controller is configured to utilise the rate of change of phase current, a measurement circuit may be provided. The measurement circuit may be provided as a dedicated measurement circuit or can be an extant portion of the power electronics. For example, it may include an inductor, the voltage across which will be equivalent to the rate of change of phase current with respect to time $$\left(\frac{di}{dt}\right).$$

The inductor could be, for example, an EMI filter inductor.

The controller may be configured, in a normal operation mode, to control the switching of the transistors of the converter so that the converter inverts the DC power received from the DC electrical network into three-phase AC power, and to provide the three-phase AC power to the stators of the electrical machine through each of three phase connections or it may be configured to control the switching of the transistors of the converter so that the converter rectifies three-phase AC power received from the electrical machine into DC power, and to provide the DC power to the DC electrical network.

The power electronics converter may include a DC-link capacitor.

The fault in the DC electrical network may be one of: a DC-link short circuit; a phase-to-phase fault; or a ground fault.

The electrical machine may be one of: a permanent magnetic machine, a surface permanent magnet synchronous motor, an inner rotor electrical machine, an outer rotor electrical machine, an axial flux electrical machine, a transverse flux electrical machine, a hybrid excitation electrical machine; a flux switching electrical machine; a flux reversal electrical machine; and a doubly salient permanent magnet electrical machine.

The transistors may be MOSFETs or gallium nitride HEMTs and the diodes may be separate from the transistors; or the transistors may be MOSFETs and the diodes may be body diodes of the MOSFETs. MOSFETs have a lower on-state voltage drop than the associated diodes and so conduction losses will be lower.

According to a second aspect, there is provided a method of controlling an electrical power system comprising an electrical machine, a DC electrical network and a power electronics converter connected between the electrical machine and the DC electrical network, the method comprising: controlling switching of transistors of the converter to either invert a DC input from the DC electrical network to an AC output and supply the AC output to the electrical machine or rectify AC power received from the electrical machine to DC power and provide the DC power to the DC electrical network; determining a condition to the effect that there is a fault in the DC electrical network; responsive to the determination, controlling the switching of the transistors of the converter so that a fault current is shared between the transistors and the associated diodes of the converter.

According to a third aspect, there is provided a controller for an electrical power system configured to: during normal operation of the electrical power system, control switching of a plurality of transistors of a power electronics converter so as to either invert DC power received by the converter from a DC electrical network to AC power and provide the AC power to an electrical machine or rectify AC power received from the electrical machine to DC power and provide the DC power to the DC electrical network; and responsive to a determination to the effect there is a fault in the DC electrical network, which is connected to a DC side of the converter, operate in a fault mode in which the controller controls the switching of the transistors of the converter so that a fault current, flowing from the electrical machine through the converter, is shared between the transistors and the associated diodes of the converter.

The controller may be implemented as a single controller or multiple separate (e.g., distributed) controllers. Thus, the controller may be or may form part of a control system. The controller may be implemented in software, hardware or a combination of the two. The controller may be or may be a functional module of an Engine Electronic Controller (EEC) or a Full Authority Digital Engine Controller (FADEC).

The power electronics converter may be a multi-level converter. The electrical machine may be a multi-phase electrical machine. The electrical machine may be a multi-lane electrical machine.

According to a fourth aspect, there is provided an aircraft power and propulsion system comprising: an electrical power system according to the first aspect. The electrical machine of the electrical power system is mechanically coupled either with a fan or propeller, or with a spool of the gas turbine engine. The electrical machine of the electrical power system may be mechanically coupled to a propeller, or a gearbox (which may then connect to a fan, turbine, or propeller). The power electronics converter may be a unidirectional DC to AC converter (i.e., an inverter) or a bidirectional DC/AC converter capable of operating as either a rectifier or an inverter depending on an operating mode of the electrical machine.

According to a fifth aspect, there is provided an aircraft comprising the power and propulsion system of the fourth aspect. The aircraft may be a solely gas-turbine-powered aircraft (e.g., a more electric aircraft), a hybrid electric aircraft, or a pure electric aircraft.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
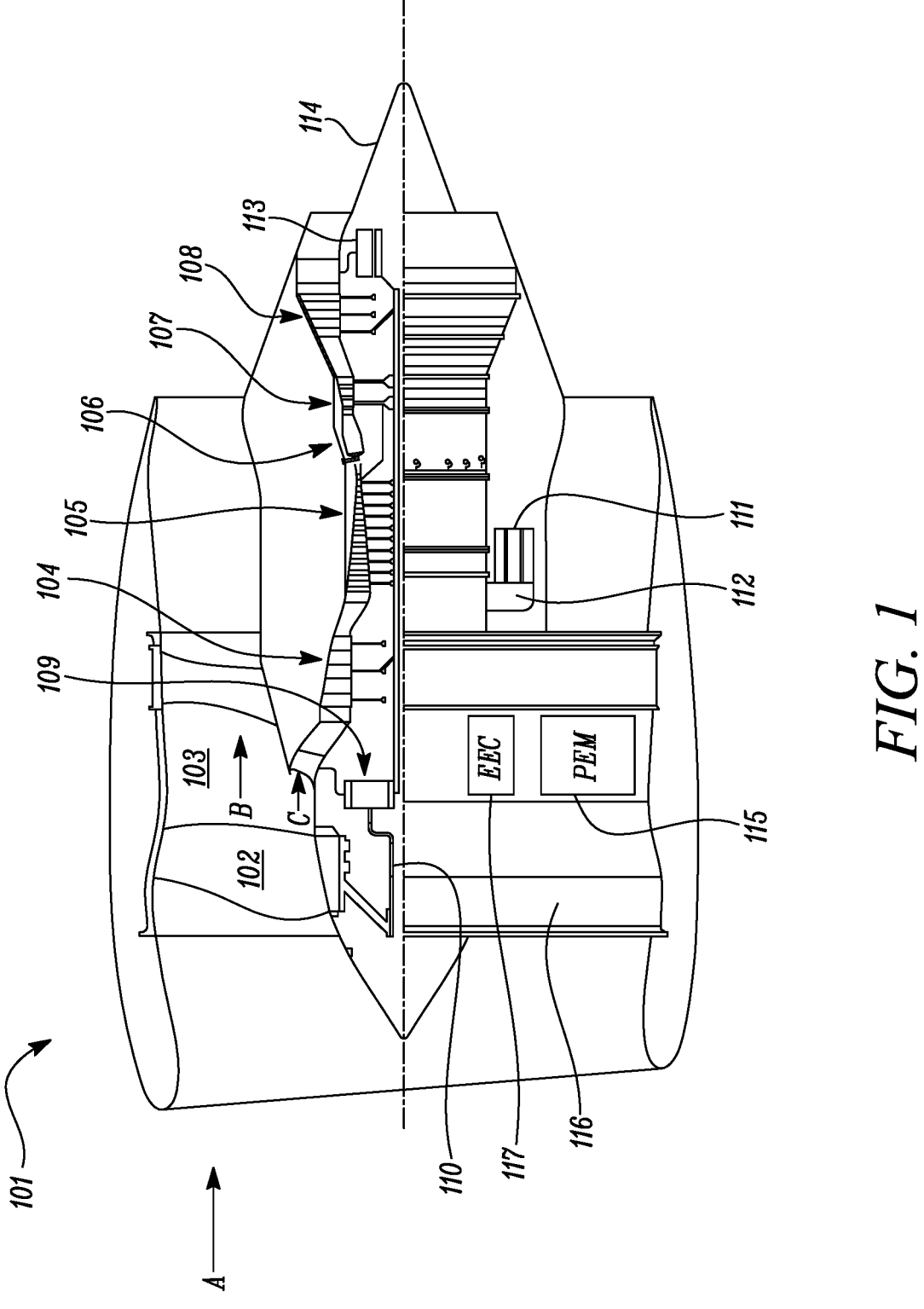
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high-pressure spool and a second rotary electrical machine 113 coupled with the low-pressure spool. In addition to generating electrical power and the starting of the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more DC busses. The DC busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
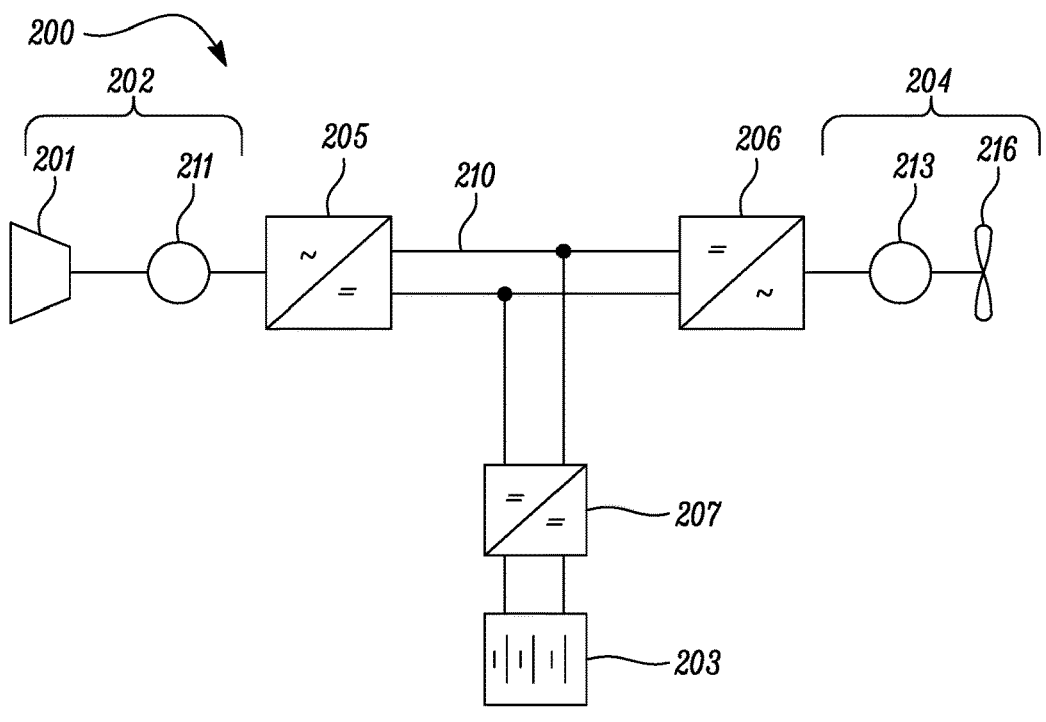
FIG. 2A is a schematic illustration of a hybrid electric aircraft propulsion system.
Figure 2B:
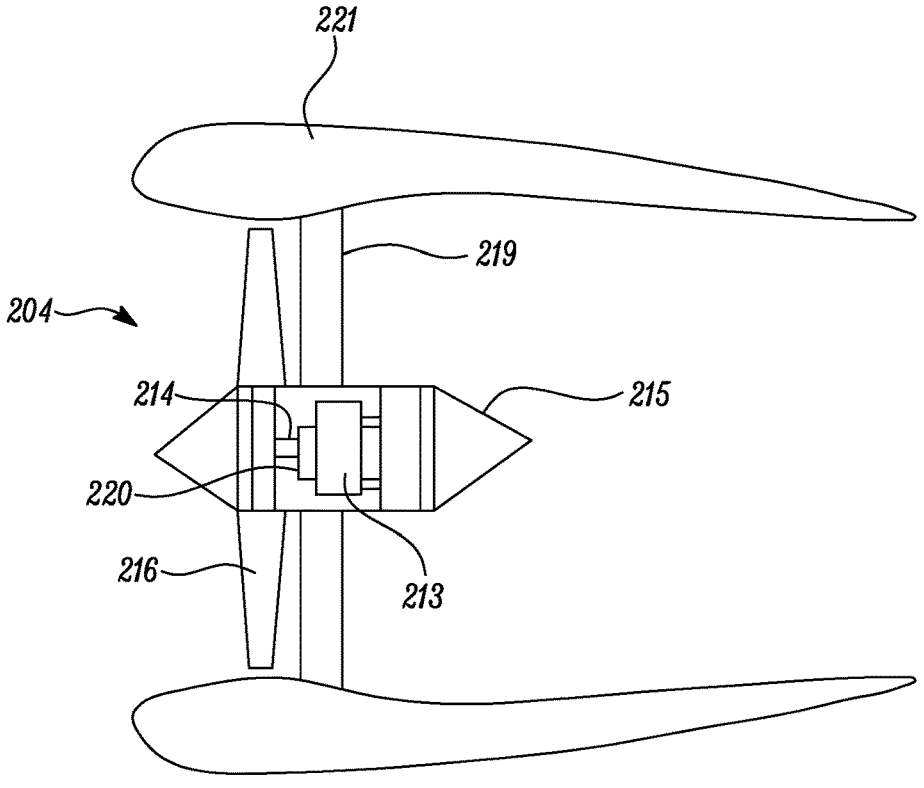
FIG. 2B illustrates an electrically powered propulsor such as may be used in a hybrid electric propulsion system.

FIG. 2A illustrates an exemplary propulsion system 200 of a hybrid electric aircraft. The propulsion system 200 includes a generator set 202 comprising a generator-engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a DC distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the generator-engine 201 is coupled to and drives the rotation of a shaft of the generator 211 which thereby produces alternating current. The AC/DC converter 205, which faces the generator 211, converts the alternating current into direct current which is fed to various electrical systems and loads via the DC distribution bus 210. These electrical systems include non-propulsive loads (not shown in FIG. 2A) and the motor 213 which drives the propulsor 204 via the DC/AC converter 206.

The battery pack 203, which may be made up of a number of battery modules connected in series and/or parallel, is connected to the DC distribution bus 210 via the DC/DC converter 207. The DC/DC converter 207 converts between a voltage of the battery pack 203 and a voltage of the DC distribution bus 210. In this way, the battery pack 203 can replace or supplement the power provided by the generator set 202 (by discharging and thereby feeding the DC distribution bus 210) or can be charged using the power provided by the generator set 202 (by being fed by the DC distribution bus 210).

Referring to FIG. 2B, in this example the propulsor 204 takes the form of a ducted fan. The fan 216 is enclosed within a fan duct 219 defined within a nacelle 221, and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the DC bus 210. The electrical machine 213 of the propulsor is a permanent magnet electrical machine. The electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Those skilled in the art will also appreciate that the hybrid architecture illustrated in FIG. 2A is only one example, and other architectures are known and will occur to those skilled in the art.

Figure 3:
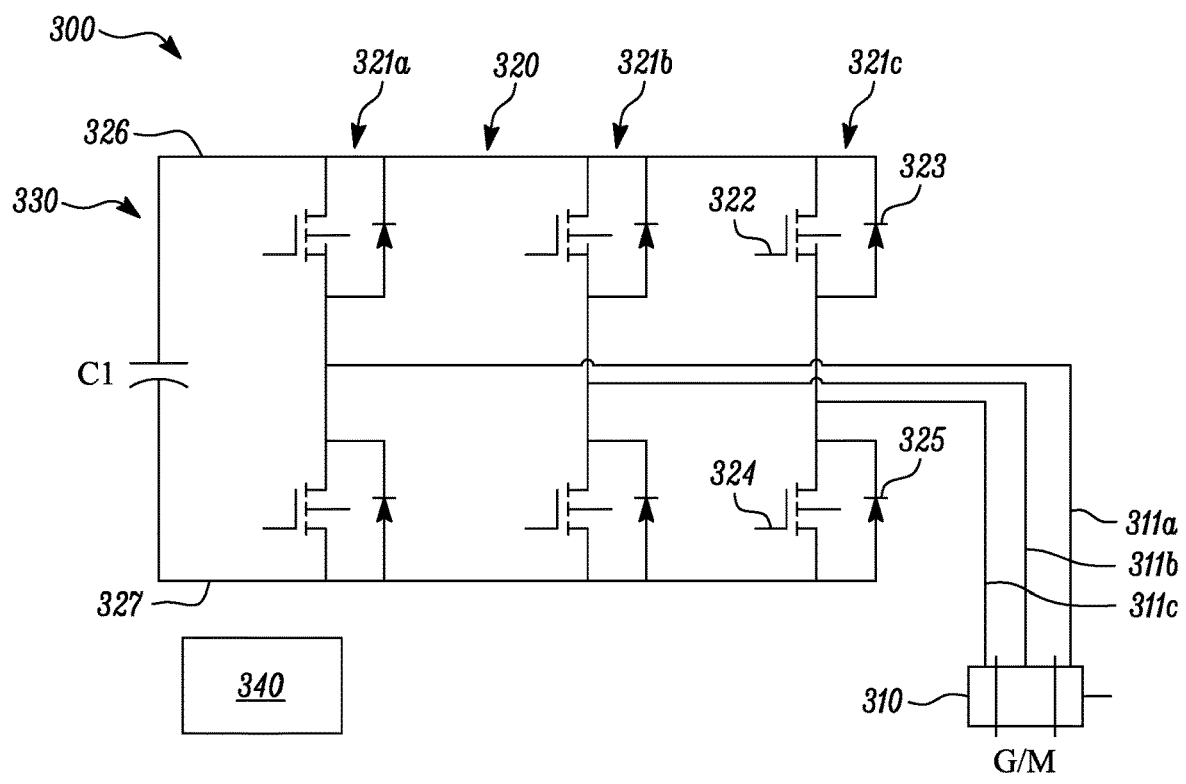
FIG. 3 illustrates a portion of an exemplary electrical power system in which a converter connects a DC network with a 3-phase electrical machine.

FIG. 3 illustrates a portion of an electrical power system 300 such as may be used in the aircraft and engine systems described above with reference to FIG. 1 and FIGS. 2A-B. The electrical power system 300 includes an electrical machine 310 operable: (i) as a motor to transform received AC power to generate motion of the rotor; or (ii) as a generator to transform motion of the rotor to generate AC power. The electrical power system 300 also includes a DC/AC power electronics converter 320 operable, in normal use, to invert DC power received from DC electrical network 330 (for example DC network 210 in FIG. 2A) and output AC power to the electrical machine 310, and a controller 340 which exercises control over the electrical power system 300 including the converter 320.

In this example the electrical machine 310 is a three-phase permanent magnet machine which receives three phases of AC power, provided by the converter 320, through three phase connections 311a, 311b, 311c. It will however be understood that other numbers of phases (e.g., four) and other connection arrangements could be used. The electrical machine 310 can be of any type and configuration suitable for the application requirements. The electrical machine 310 may be specifically configured as a motor, or it may be operable in both motor and generator modes (e.g., where the electrical machine 310 is a 'starter-generator' of a gas turbine engine).

The illustrated power electronics converter 320 is a two-level, three-phase full-bridge rectifier with metal-oxide-semiconductor field-effect transistors (MOSFETs). It includes three phase legs 321a, 321b, 321c, each of which is connected to a corresponding one of the phase connections 311a, 311b, 311c to which it provides AC power. Each phase leg 321a, 321b, 321c includes two branches: a first (upper) branch which includes a transistor 322 and associated diode 323 connected in anti-parallel with the transistor 322 and a second (lower) branch which includes a transistor 324 and associated diode 325 connected in anti-parallel with the transistor 324. The associated diodes may be implemented either as the MOSFET's inherent body diode, or as discrete, external (to the MOSFET) diodes. Generally speaking it is preferable to use discrete, external, anti-parallel diodes, as the additional diode may permit e.g., faster switching, higher current rating and lower on-state voltage drop. The upper branch of each phase leg 321a, 321b, 321c is connected with a first DC input 326. The lower branch of each phase leg 321a, 321b, 321c is connected with a second DC input 327. The first and second DC inputs 326, 327 connect with the DC electrical network 330, whereby the DC electrical network 330 supplies DC electrical power to the converter 320. A DC-link capacitor 328 is also shown, the function of which will be familiar to those skilled in the art of power electronics.

Whilst a two-level, three-phase rectifier 320 with MOS-FETs is illustrated, this is not intended to limit the disclosure. Different numbers of phases and different converter topologies may be used. The MOSFETs may be, e.g., wide band gap semiconductor MOSFETs such as Silicon Carbide (SiC) MOSFETs. The converter 320 may also utilise another type of transistor, for example gallium nitride HEMTs (high electron mobility transistors).

During normal operation of the converter 320 as an inverter, the controller 340 uses pulse width modulation, providing signals to a gate of each transistor to control the switching of the transistors and so switch current between the first and second DC inputs 326, 327 to affect suitable inversion of the DC to AC.

Figure 4:
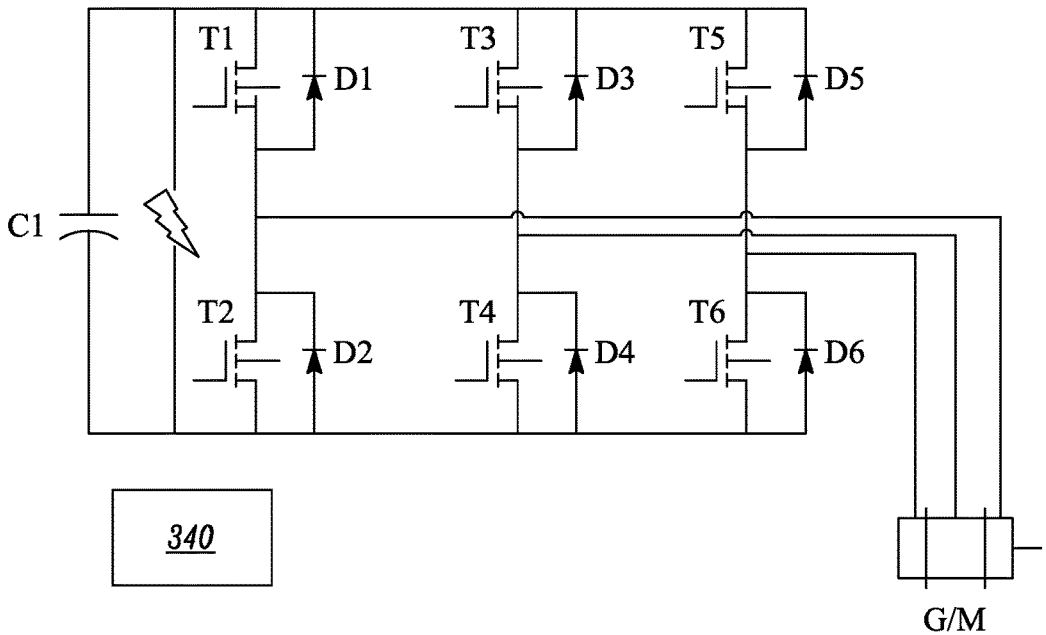
FIG. 4 illustrates the portion of the exemplary electrical power system of FIG. 3 during a DC network fault.

FIG. 4 illustrates the effect of a DC network fault (e.g., a fault in a load connected in the DC network which places a low impedance across the DC network terminals) on the operation of the electrical power system 300.

Following a fault in the DC network 330, for example due to a DC-link short circuit fault, the DC-side voltage collapses, possibly to zero volts though in general the fault may have some resistance in which case the voltage may not collapse all the way to zero. The significance of this is that the fault current supplied to the DC network 330 will be controlled almost exclusively by the voltage generated by the electrical machine 310 and the machine's impedance. The fault current supplied to the converter 320 from the electrical machine 310 will therefore typically be very large, particularly as the electrical machine is a permeant magnet machine. It will also be an AC current due to the electrical machine operating as a generator.

A result of using permeant magnet machines, which are typically designed with low inductance values so as to maintain adequate voltage reserve and thereby ride through load transients, is that the fault current flowing through the power converter can read up to and beyond 200% of the rated values. Upon a DC-link short circuit fault, the phase current will rise abruptly, and will trigger inherent desaturation functions in the gate drivers. This initially disables all PWM signals provided to the MOSFETs from the controller 340. The converter then becomes an uncontrolled diode rectifier with freewheeling diodes.

Figure 5:
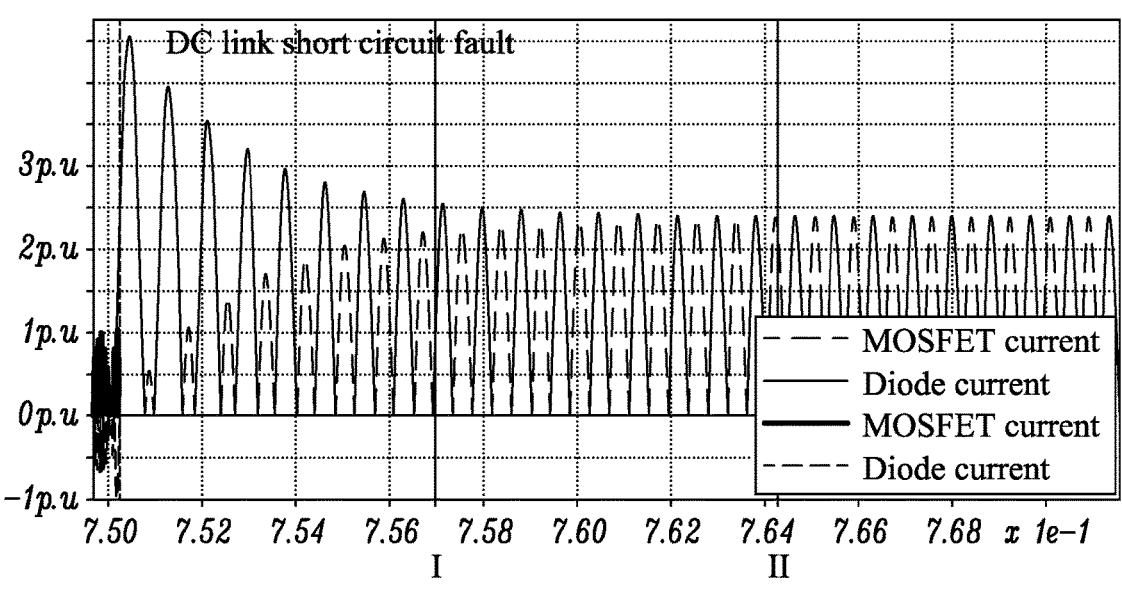
FIG. 5 is a plot of current through the converter prior to and during a DC-link short circuit fault.
Figure 6:
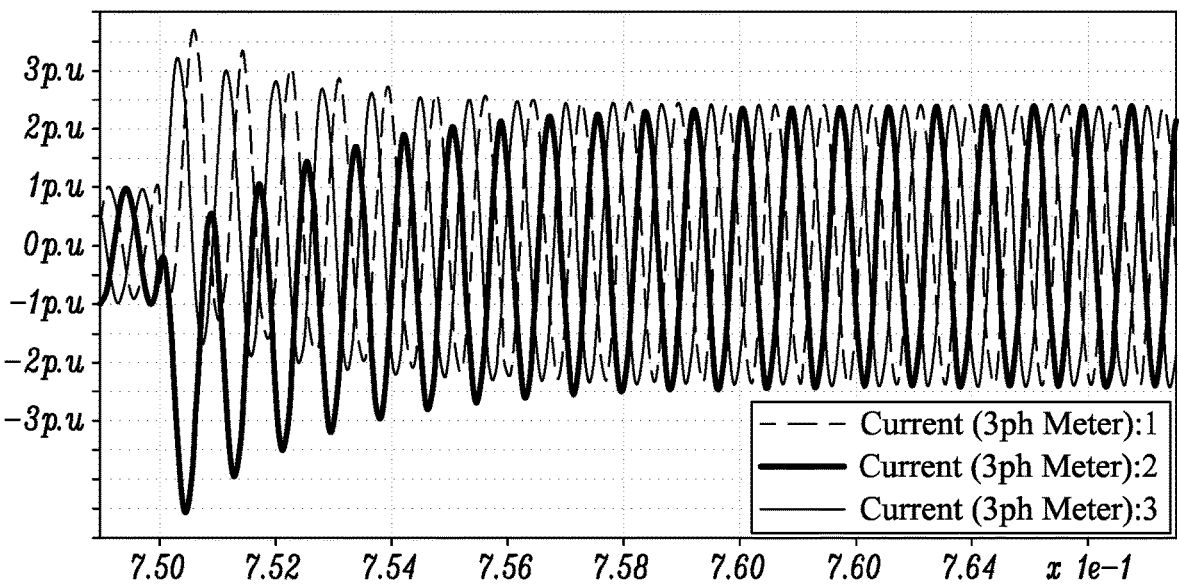
FIG. 6 is a plot of the three phase currents generated by the electric machine during a DC-link short circuit fault.

During a DC-link short circuit fault, the anti-parallel diodes form a three-phase diode bridge, where each diode conducts for 180 electrical degrees. This is shown in FIG. 5, where an initial current of over 3× the normal operating current (3 p.u.) is generated. The motor/generator will see the fault as a symmetrical fault and produce an AC fault current with a magnitude over 200% of the rated current (depending on the machine design). This is shown in FIG. 6.

Figure 7:
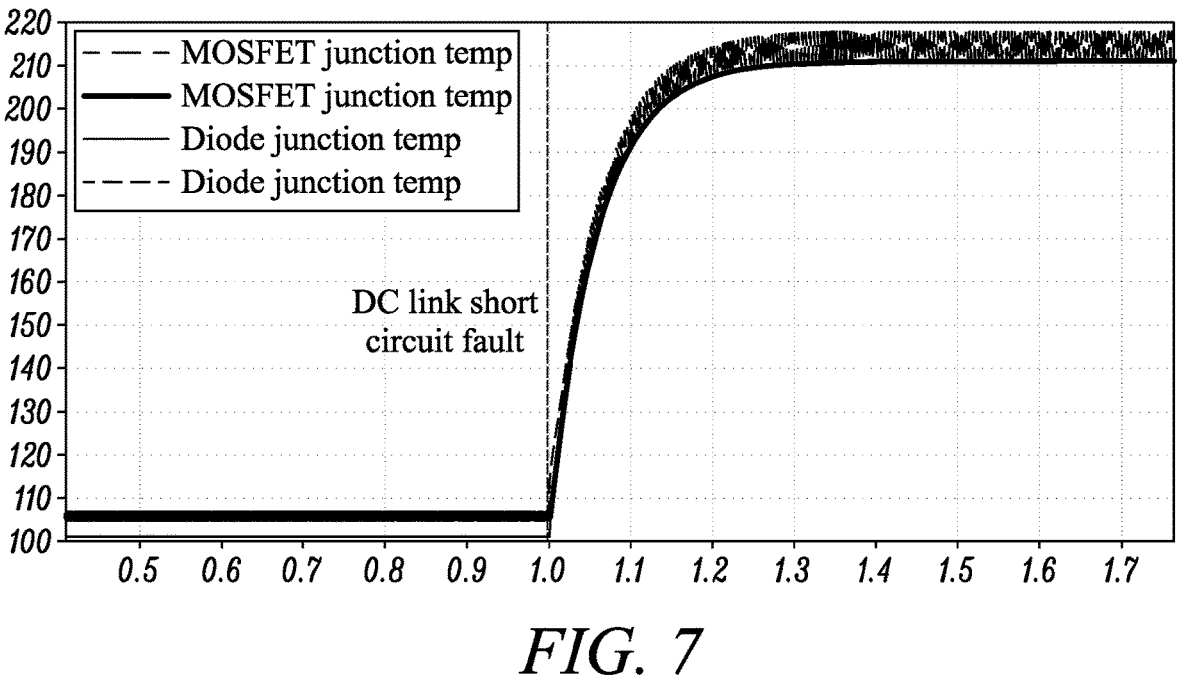
FIG. 7 is a plot of MOSFET and diode junction temperature against time prior to and during a DC-link short circuit fault without application of the disclosure.

Even with silicon carbide diodes, the on-state voltage drop across the diodes is often higher than that of the MOSFETs. This can lead to considerably higher conduction losses than the rated conditions. The increased loss will also heat up the diodes and the power module casing, eventually leading to the thermal breakdown of both the diode and MOSFET junctions. This is illustrated in FIGS. 5 and 7, where the motor/generator fault current is around 2 per unit.

In a machine with a higher power factor, the fault current can reach significantly higher values depending on the machine inductance. Upon a DC-link short circuit fault, the phase current in prior art systems is 100% channelled by the diode rectifier as shown in FIG. 5 and the diode junction temperature may increase by as much as 100° C. as shown in FIG. 7. The majority of power modules can tolerate a maximum junction temperature of between 150° C. and 175° C., which means typically thermal breakdown of the junction would occur without the present disclosure.

Therefore, in accordance with the present disclosure, in response to a determination that a fault has occurred in the DC electrical network, which leads to an AC fault current flowing from the electrical machine through the power electronics module, the controller is configured to operate in a fault mode in which switching of the transistors is controlled so that the fault current is shared between the transistors and the associated diodes in the converter (now operating, by virtue of the fault, as an AC/DC converter).

Figure 8:
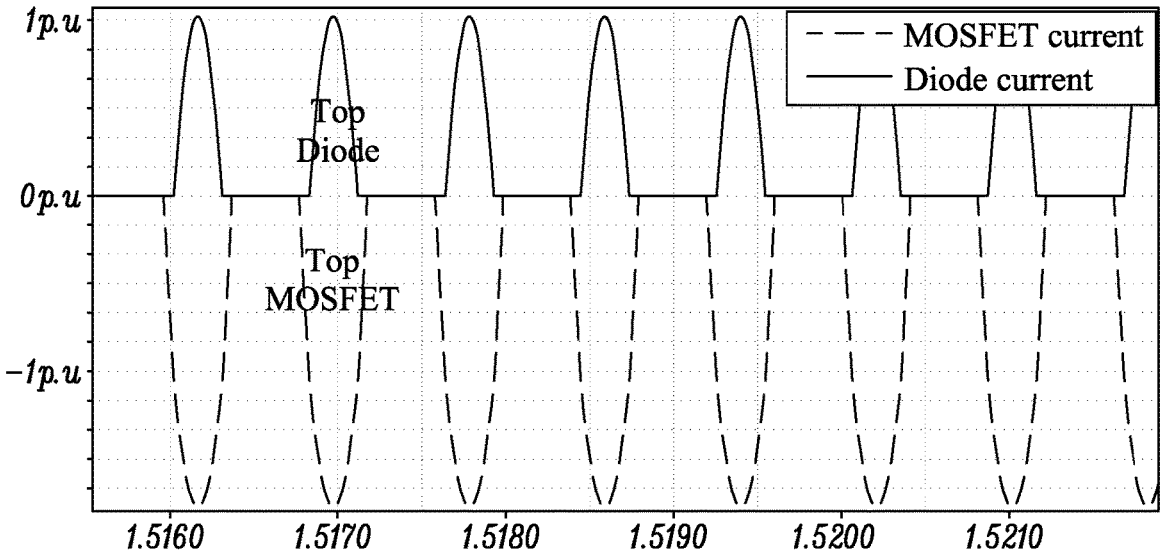
FIG. 8 is a plot showing the current flowing through a MOSFET-diode pair after a DC-link short circuit fault.

FIG. 8 is a plot of current (in relative units) against time through a given MOSFET-diode pair under a first fault mode. In this example, the MOSFETs are turned on synchronously with the phase currents of the electrical machine, and so are conductive for an entire 180° half-wave of the phase current. The current is therefore shared between the MOSFET and diode, in this example with the MOSFET conducting more of the current than the diode.

In an alternative fault mode, the phase current is used for a phase locked loop to decide the commutation angles for the MOSFET turn-on pulses so as to share the current between the MOSFETs and diodes. Based on the required angle, the gate pulses for the MOSFETs will be shifted by a predetermined angle aligned with the phase current vector either by adopting zero-crossing detection or through current phase locked loops. By doing so, each MOSFET will be turned on to share the current fault with the freewheeling diodes in a more adjustable manner than shown with respect to FIG. 8. The controller may use the position of the rotor in the electrical machine to determine the zero-crossing, and thereby the required phase shift in the angle.

Figure 9:
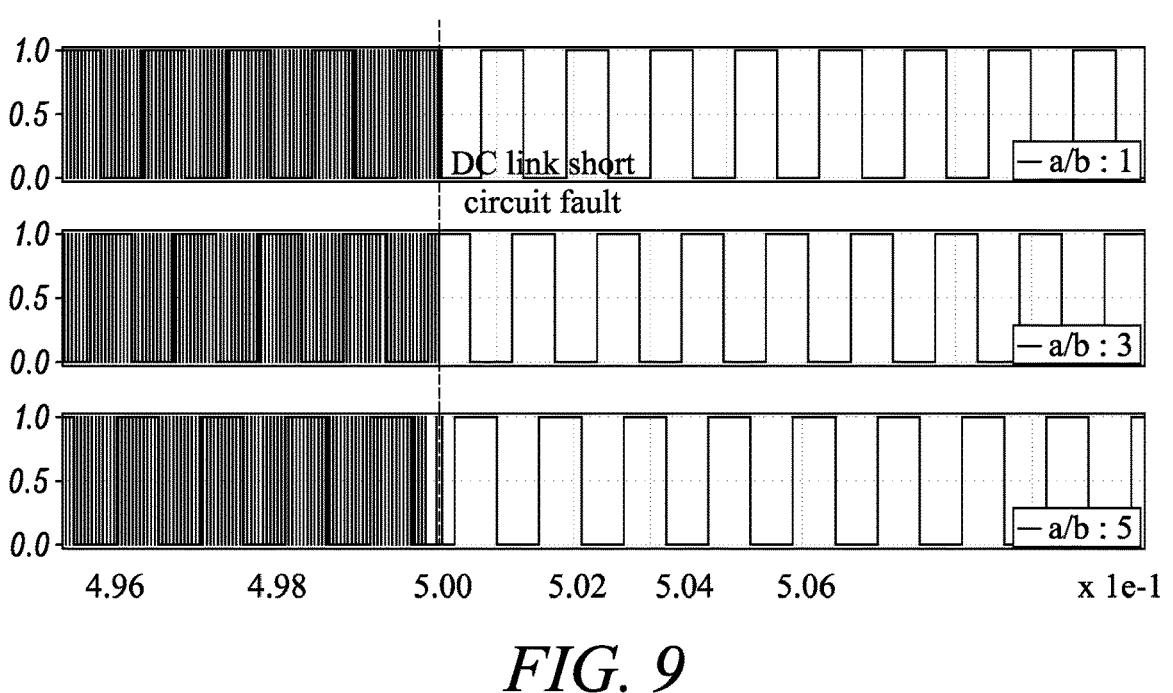
FIG. 9 illustrates the turn-on gate pulses for the three transistors of the converter prior to and during a DC-link short circuit.

Each MOSFET can be turned on for a duration of up to 180°, depending on the phase current. The 180° angle represents the fully synchronous switching of the MOSFET (also referred to as 'full' six step control), whereas it is typically preferable that the MOSFETs are switched on for less than 180° (also referred to as 'partial' six step control). The required angle may be determined at the design stage, upon considering the operating and fault conditions. Optionally, the angle shift may be determined dynamically by considering the phase currents, case temperature, junction temperature, and/or other operation conditions of the inverter. In examples where the MOSFETs have a lower current rating than the freewheeling diodes, the conduction angle may be reduced to less than 180° to distribute the current (that is, under the 'partial' six step commutation). An example of the turn-on pulses of the MOSFETs prior to and during a DC-link short-circuit is shown in FIG. 9.

Figure 10:
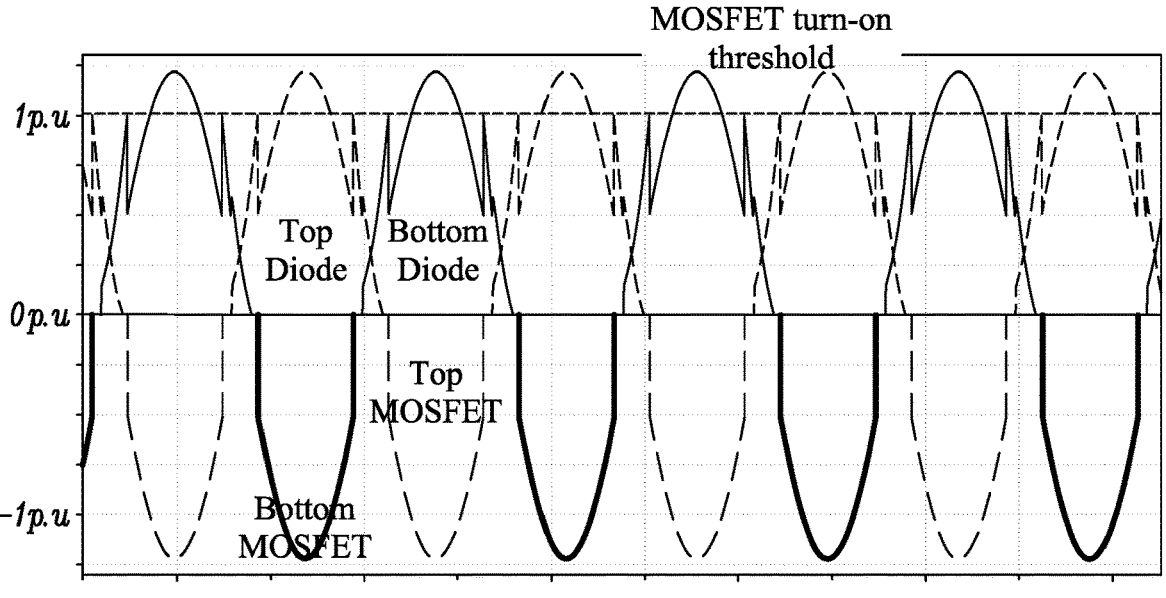
FIG. 10 is a plot showing the current flowing through two MOSFET-diode pairs according to an alternative control scheme after a DC-link short circuit fault.

As discussed previously, the MOSFET conduction angle may be set to values other than 180°. Indeed, the conduction of the MOSFET can be commanded by comparing phase current measurements with a threshold as shown in FIG. 10. For lower phase current values, i.e., those below the turn-on threshold, the freewheeling diodes will solely conduct, whilst above the threshold the MOSFET(s) will also begin to conduct. By manipulating the threshold current for the MOSFET(s) to conduct, dynamic balancing of the thermal load of the power devices can be achieved. In this manner, the current waveform in the MOSFET and the diode are still symmetrical as can be seen in FIG. 10.

Figure 11:
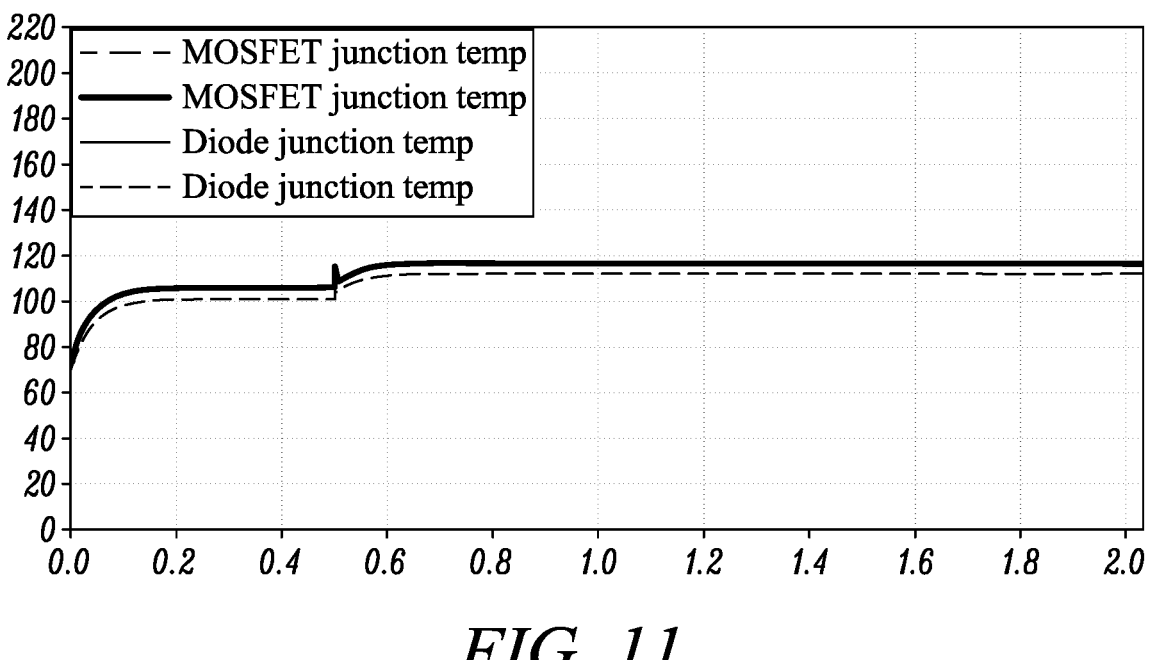
FIG. 11 is a plot of MOSFET and diode junction temperatures against time prior to and during a DC-link short circuit with application of the disclosure.

FIG. 11 is a plot of MOSFET and diode junction temperatures against time prior to and during a DC-link short circuit with application of the disclosure. In contrast to the temperature plot in FIG. 7, it can be seen that the temperature increase as a result of the DC-link short circuit is modest and limited.

Figure 12:
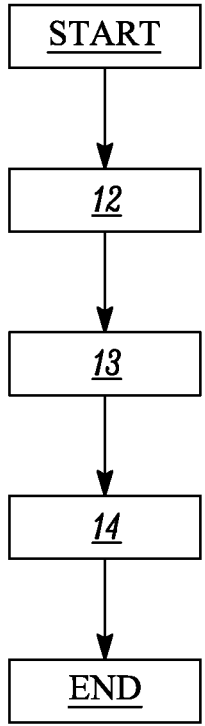
FIG. 12 illustrates a method of controlling an electrical power system.

FIG. 12 illustrates a method of controlling an electrical power system of the type shown in FIG. 3. In a first step, 12, the switching of the transistors of the convers is controlled to either invert a DC input from the DC electrical network to an AC output and to supply the AC output to the electrical machine or rectify an AC input from the electrical machine to a DC output and supply the DC output to the DC electrical network. In step 13, a determination is made of a condition to the effect that there is a fault in the DC electrical network, leading to an AC fault current flowing from the electrical machine through the power electronics converter. Responsive to this determination, step 14 is performed in which the switching of the transistors is controlled so that the fault current is shared between the transistors and the associated diodes of the converter.

Figure 13:
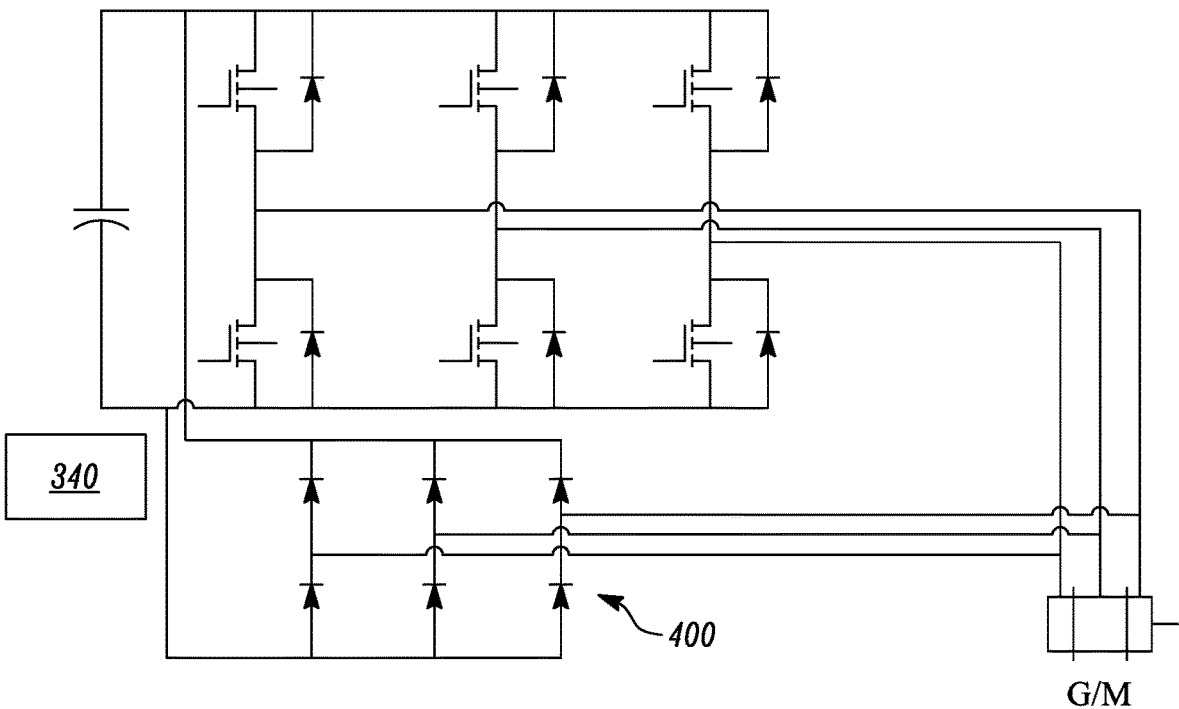
FIG. 13 illustrates an alternative portion of an electrical power system which includes a supplementary freewheeling diode subcircuit.

FIG. 13 illustrates an alternative portion of an electrical power system which includes a supplementary freewheeling diode subcircuit. It differs from the electrical power system shown previously, in that it further includes a supplementary freewheeling diode subcircuit 400. The subcircuit 400 is connected in parallel to the converter, and so when an AC fault current develops from the electrical machine it is split between the subcircuit 400 and the converter.

Various examples have been described, each of which feature various combinations of features. It will be appreciated by those skilled in the art that, except where clearly mutually exclusive, any of the features may be employed separately or in combination with any other features and the disclosure extends to and includes all combinations and sub-combinations of one or more features described herein.

It should also be noted that whilst the embodiments have been described with reference to an aircraft, and to turbofan engines, it will be understood that the principles of the described electrical systems may be applied to other installations, for example to aircraft with turboprop engines, aircraft with purely electric power and propulsion systems, to marine environments such as on a naval vessel powered by gas turbines, a hybrid system or purely electric system, and to other transport applications including trains.

The invention claimed is:

1. An electrical power system comprising:
a permanent magnet electrical machine comprising a stator and a rotor, the rotor coupled to a drive shaft of an engine;
a DC electrical network;
a power electronics converter connected, on a DC-side, to the DC electrical network and, on an AC-side, to the electrical machine, the power electronics converter comprising a plurality of transistors and associated diodes connected in anti-parallel with the transistors; and
a controller configured, in a normal operation mode, to control switching of the transistors of the converter so that the converter either inverts DC power received from the DC electrical network to AC power and provides the AC power to the electrical machine or rectifies AC power received from the electrical machine to DC power and provides the DC power to the DC electrical network,
wherein the controller is further configured, responsive to a determination that there is a fault in the DC electrical network, to operate in a fault mode in which the controller controls the switching of the transistors of the converter so that a fault current is shared between the transistors and the associated diodes of the converter, the controller being configured to control an on-time of the transistors, during which they conduct the fault current from the electrical machine, so as to be less than a full half-cycle with respect to the fault current;
wherein controlling the on-time of the transistors comprises determining a shifted phase angle by phase shifting a phase angle associated with the normal operation mode, and providing on gate pulses for the transistors according to the shifted phase angle; and
wherein determining the shifted phase angle comprises phase shifting the phase angle associated with the normal operation mode by a predetermined angle aligned with a phase current vector.

2. The electrical power system of claim 1, wherein the phase current vector is determined using zero-crossing detection or a current phase locked loop.

3. The electrical power system of claim 1, wherein, in the fault mode, the controller is configured to compare a magnitude of the fault current to a threshold, and to turn on one or more of the transistors when the magnitude of the fault current exceeds the threshold and to switch off the one or more transistors when the magnitude of the fault current is less than the threshold.

4. The electrical power system of claim 3, wherein the controller is configured to modify the threshold.

5. The electrical power system of claim 4, wherein the controller is configured to modify the threshold based on a sensed temperature or an estimated temperature of at least one of the transistors or the associated diodes.

6. The electrical power system of claim 1, further comprising a supplementary freewheeling diode subcircuit, connected in parallel with the power electronics converter.

7. The electrical power system of claim 1, wherein the controller is configured to determine the fault in the DC electrical network by determining that a phase current through the power electronics converter, or a rate of change of the phase current through the power electronics converter with respect to time, has exceeded a protection threshold.

8. The electrical power system of claim 1, wherein the fault in the DC electrical network is one of: a DC-link short circuit; a phase-to-phase fault; or a ground fault.

9. The electrical power system of claim 1, wherein the electrical machine is one of: a hybrid excitation electrical machine; a flux switching electrical machine; a flux reversal electrical machines; and a doubly salient permanent magnet electrical machine.

10. The electrical power system of claim 1, in which:

the transistors are MOSFETs or gallium nitride HEMTs and the associated diodes are separate from the transistors; or the transistors are MOSFETs and the associated diodes are body diodes of the MOSFETs.

11. An aircraft power and propulsion system comprising:

an electrical power system according to claim 1, wherein the electrical machine of the electrical power system is mechanically coupled with a fan or propeller, or with a spool of a gas turbine engine.

12. An aircraft comprising the aircraft power and propulsion system of claim 11.

13. A method of controlling an electrical power system comprising an electrical machine, a DC electrical network, a controller, and a power electronics converter connected between the electrical machine and the DC electrical network, the method comprising:

controlling switching of transistors of the power electronics converter to either invert a DC input from the DC electrical network to an AC output and supply the AC output to the electrical machine or rectify an AC power received from the electrical machine to DC power and provide the DC power to the DC electrical network;

determining a condition to the effect that there is a fault in the DC electrical network; and responsive to the determination, controlling the switching of the transistors of the converter so that a fault current is shared between the transistors and the associated diodes of the converter, the controller being configured to control an on-time of the transistors, during which they conduct the fault current from the electrical machine, so as to be less than a full half-cycle with respect to the fault current; and wherein controlling the on-time of the transistors comprises determining a shifted phase angle by phase shifting a phase angle associated with a normal operation mode, and providing on gate pulses for the transistors according to the shifted phase angle; and wherein determining the shifted phase angle comprises phase shifting the phase angle associated with the normal operation mode by a predetermined angle aligned with a phase current vector.

14. A controller for an electrical power system configured to:

during normal operation of the electrical power system, control switching of a plurality of transistors of a power electronics converter so as to either invert DC power received by the converter from a DC electrical network to AC power and provide the AC power to an electrical machine or rectify AC power received from the electrical machine to DC power and provide the DC power to the DC electrical network;

responsive to a determination to the effect there is a fault in the DC electrical network, which is connected to a DC side of the converter, operate in a fault mode in which the controller controls the switching of the transistors of the converter so that a fault current, flowing from the electrical machine through the converter, is shared between the transistors and the associated diodes of the converter, the controller being configured to control an on-time of the transistors, during which they conduct the fault current from the electrical machine, so as to be less than a full half-cycle with respect to the fault current;

wherein controlling the on-time of the transistors comprises determining a shifted phase angle by phase shifting a phase angle associated with a normal operation mode, and providing on gate pulses for the transistors according to the shifted phase angle; and wherein determining the shifted phase angle comprises phase shifting the phase angle associated with the normal operation mode by a predetermined angle aligned with a phase current vector.

* * * * *